United States Patent Office 3,583,996
Patented June 8, 1971

3,583,996
PROCESS FOR THE PREPARATION OF CERTAIN ALKALOID ALCOHOL ESTERS OF TROPIC ACID
Rolf Banholzer, Alex Heusner, Otto Korndörfer, Werner Schulz, Gerhard Walther, and Karl Zeile, Ingelheim am Rhein, Germany, assignors to Boehringer Ingelheim G.m.b.H., Ingelheim am Rhein, Germany
No Drawing. Continuation-in-part of application Ser. No. 663,986, Aug. 29, 1967. This application Dec. 3, 1969, Ser. No. 881,890
Claims priority, application Germany, Sept. 2, 1966, B 88,749; Sept. 29, 1966, P 16 70 152.3; Oct. 7, 1966, P 16 70 155.6
Int. Cl. C07d 29/24, 43/06
U.S. Cl. 260—292                                    12 Claims

ABSTRACT OF THE DISCLOSURE

An improved process for the preparation of a pure alkaloid alcohol ester of tropic acid comprising the formation of an alkaloid alcohol ester of α-formyl-phenylacetic acid by ester interchange followed by reduction of the ester interchange product, which consists of heating an inert organic solvent to its boiling point, simultaneously adding to the boiling solvent a solution of an α-formyl-phenyl-acetic acid lower alkyl ester in the solvent and a solution of an alkaloid alcohol in the solvent, while continuously distilling off a vapor mixture consisting of the solvent and a lower alkanol at substantially the same volumetric rate as the said solutions are being added, and reducing the alkaloid alcohol ester of α-formyl-phenyl-acetic acid formed thereby with an alkali metal borohydride.

This is a continuation-in-part of copending application Ser. No. 663,986, filed Aug. 29, 1967, now Pat. No. 3,502,683 granted Mar. 24, 1970.

This invention relates to an improved process for the preparation of certain alkaloid alcohol esters of tropic acid comprising the steps of subjecting an alkaloid alcohol to an ester interchange reaction with an α-formyl-phenylacetic acid lower alkyl ester, and reducing the alkaloid alcohol ester of α-formyl-phenylacetic acid formed thereby with an alkali metal borohydride.

BACKGROUND OF THE INVENTION

The synthesis of a formyl-phenylacetic acid esters, by reacting ethyl phenylacetate with ethyl formate and sodium in absolute ether to form ethyl formyl-phenylacetate, was first reported by W. Wislicenus, Berichte der Deutschen Chemischen Gesellschaft 20, 2933 (1887) and 28, 767 (1895); Liebigs Annalen der Chemie 291, 147 (1896), 389, 265 (1912) and 413, 206 (1917).

Following the procedure described by Wislicenus, Y. Asahina and H. Nogami reacted ethyl formate with tropine phenylacetate in ethereal solution in the presence of sodium and obtained tropine α-formyl-phenylacetate with a yield of less than 40% of theory [Proceedings of the Emperial Academy of Japan 16, 230 (1940)].

Thereafter, C. A. Friedmann and J. M. Z. Gladych modified this prescribed procedure in that they used sodium ethylate in place of sodium and xylene in place of ether [J. Chem. Soc. (London) 1956, 310]; however, they obtained yields of only 40% of theory of tropine α-formyl-phenylacetate. An increase in the yield by intensifying the reaction conditions remains without promise of success because of the instability of the tropine α-formyl-phenylacetate. Our own attempts to form the tropine ester of α-formyl-phenylacetic acid by ester interchange between α-formyl-phenylacetic acid methyl ester and tropine under basic catalysis, analogous to the method of J. H. Billman, W. T. Smith, Jr. and J. R. Rendall, J.A.C.S. 69, 2058 (1947), met with failure.

Likewise, we were unsuccessful in preparing the tropine ester of α-formyl-phenylacetic acid by ester interchange reaction between α-formyl-phenylacetic acid ethyl ester and tropine under acid catalysis, analogous to the method described in Organic Syntheses II, 469 (1943).

Finally, German Auslegeschrift 1,102,106 discloses a method of preparing a tropine which comprises reducing the tropine ester of α-phenyl-acetic acid by catalytic hydrogenation in the presence of Raney nickel. However, this process requires 60 gm. of Raney nickel catalyst for each 16 gm. of α-formyl-phenylacetic acid tropine ester and yields only 60% of theory of atropine. Moreover, by the patentees' own admission the atropine produced thereby contains up to 5% by weight of apoatropine which must subsequently be removed in a separate step. Consequently, considering the amount of work involved and the relatively low yield obtained, this method does not readily lend itself to satisfactory industrial scale application.

OBJECTS OF THE INVENTION

It is an object of the present invention to provide an economical industrial process for the preparation of alkaloid alcohol esters of tropic acid which produces high yields of the desired pure end product.

It is another object of the present invention to provide a more efficient method for preparing certain alkaloid esters of α-formyl-phenylacetic acid by ester interchange which will produce high yields of the desired intermediate product.

Other objects and advantages of the present invention will become apparent as the description thereof proceeds.

THE INVENTION

In its broadest aspects, the present invention relates to a two-step process for the preparation of alkaloid alcohol esters of tropic acid of the formula

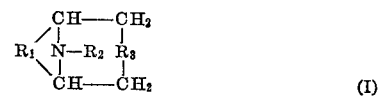

wherein:

$R_1$ is $-(CH_2)_2-$, $-(CH_2)_3-$, $-CH=CH-$,

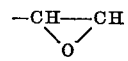

$-CHOH-CH_2-$, $-CHOCH_3-CH_2-$ or $-CHOH-CHOH-$ $R_2$ is a saturated or unsaturated straight of branched aliphatic radical of 1 to 16 carbon atoms which may have a cycloalkyl, alkoxy, aryloxy, dialkylamino or diaralkylamino substituent attached thereto, benzyl, halobenzyl, lower alkyl-benzyl, lower alkoxy-benzyl, phenyl-benzyl or cycloalkyl of 3 to 8 carbon atoms, $R_3$ is

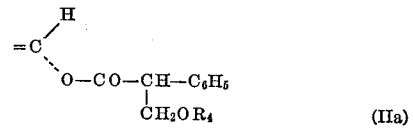

or

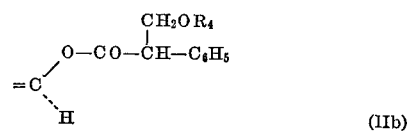

where $R_4$ is hydrogen or acyl, and $R_1$ and $R_3$, together, with each other, are

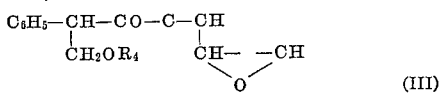

where $R_4$ is hydrogen or acyl, their stereoisomers, or non-toxic, pharmacologically acceptable acid addition salts of said tropic acid derivatives or their stereoisomers.

The compounds of the Formula I are prepared according to the present invention by reacting an α-formylphenylacetic acid alkyl ester with an alkaloid alcohol of the formula $$R_5OH \qquad (IV)$$

wherein $R_5$ is

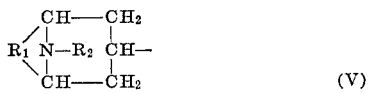

or

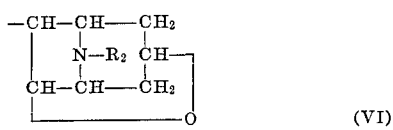

where $R_2$ has the same meanings as in Formula I, and subsequently reducing the α-formyl-phenylacetic acid ester of alcohol IV with an alkali metal borohydride.

Thus, the process according to the present invention proceeds pursuant to the following schematic equation:

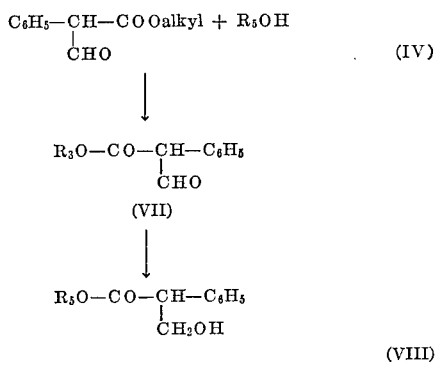

The first step, that is, the reaction between the α-formylphenylacetic acid alkyl ester, preferably a lower alkyl ester, such as methyl ester, with the alkaloid alcohol of the Formula IV, is one aspect in the improvement according to the instant invention.

We have discovered that one object set forth above is achieved by heating an inert solvent, such as toluene or xylene, to its boiling point, simultaneously adding to the boiling solvent a solution of an α-formyl-phenylacetic acid lower alkyl ester in the same solvent and a solution of an alkaloid alcohol of the Formula IV in the same solvent, while continuously distilling off a vapor mixture consisting of the solvent and the lower alkanol formed by the ester interchange reaction at substantially the same volumetric rate as the said solutions are being added, and recovering the reaction product of the Formula VI from the reaction mixture. The yield of the alkaloid alcohol ester of α-formylphenylacetic acid VII is thereby surprisingly increased to about 80% of theory.

The second step, that is, the reduction of compound VII, is the other factor in the improved process according to the present invention. We have discovered that by reducing the alkaloid alcohol ester of α-formylphenylacetic acid obtained in the first step with an alkali metal borohydride, the yield of alkaloid alcohol tropine ester is significantly increased and, in addition, the purity of the raw end product is so high that no further purification is necessary. For instance, the reduction of the tropine ester of α-formyl-phenylacetic acid with an alkali metal borohydride yields about 85% of theory of raw atropine which is free from apoatropine, as evidenced by the absence of the characteristic absorption bands of apoatropine in the ultra-violet spectrogram.

The reduction of compound VII in accordance with the instant invention is carried out in the presence of a suitable solvent. The solvent may be water as well as an organic solvent, such as methanol, ethanol, ether, benzene or mixtures of these. Examples of suitable alkali metal borohydrides are lithium borohydride, sodium borohydride and potassium borohydride.

In those cases where $R_4$ in the end product of the formula I is to be acyl, the corresponding compound of the Formula I wherein $R_4$ in hydrogen is acylated by customary methods, such as by reacting it with the desired acid halide or acid anhydride.

The process according to the present invention always yields the desired end product of the Formula I in the form of a racemic mixture, which must subsequently be subjected to a separation procedure to obtain the pure stereoisomers. This separation may be effected pursuant to customary methods, for instance by forming a salt with an optically active acid such as tartaric acid dibenzyl - tartaric acid, camphorsulfonic acid or bromocamphorsulfonic acid.

The synthesis of the instant invention may be applied to the α- as well as the β-form (pseudo form) of an alcohol of the Formula IV.

The compounds of the Formula I are organic bases and therefore form acid addition salts with inorganic or organic acids. Such acid addition salts may be obtained in customary fashion, such as by dissolving the free base in a suitable solvent and acidifying the solution with the desired inorganic or organic acid. Examples of non-toxic, pharmacologically acceptable acid addition salts are those formed with hydrochloric acid, hydrobromic acid, sulfuric acid, acetic acid, propionic acid, succinic acid, tartaric acid, citric acid, fumaric acid, maleic acid, ascorbic acid, toluenesulfonic acid, 8-chlorotheophylline or the like.

The starting compounds required for the process according to the present invention may be prepared by well known methods.

Thus, an N-substituted nortropine may be obtained by reacting succinaldehyde, acetonedicarboxylic acid and a corresponding amine hydrochloride pursuant to the Robinson-Schöpf-Synthesis [J. Chem. Soc., vol. 111, page 762 (1917)] to form the corresponding N-substituted nortropinone, and subsequently reducing the latter. If the reduction is carried out with hydrogen in the presence of Raney nickel as a catalyst, the α-form of the desired N-substituted nortropine is obtained (see U.S. Patent 2,366,760). On the other hand, if the reduction is effected with the aid of sodium in ethanol or with sodium amalgam, the corresponding N-substituted pseudonortropine (β-form) is obtained [Berichte der Deutschen Chemischen Gesellschaft vol. 29, page 936 (1896)]. An N-substituted norscopine may be obtained by demethylation of O-acetylscopine, for instance, by the method of Schmidt, Werner and Kumpe [Annalen der chemie, vol. 688, page 288 (1965)], substitution at the nitrogen atom and subsequent hydrolysis.

A tropen-(6)-ol-(3α) may, for example, be obtained by the process described by G. Fodor [J. Chem. Soc. (1959), pages 3461–3565] from tropane-3α,6β-diol. Tropen-(6)-ol-(3β), M.P. 94–96°, may be obtained analogous to the process of transformation of tropin to pseudotropin by R. Willstätter (Ber. Deutsch. Chem. Ges. vol. 29, page 936 (1896).

An N-substituted granatanol may be obtained by reacting glutardialdehyde, acetonedicarboxylic acid and the corresponding amine hydrochloride pursuant to Robinson-Schöpf [J. Chem. Coc., vol. 118 (1924), page 2169; Berichte der Deutschen Chemischen Gesellschaft, vol. 29, page 482; ibid, vol. 38, page 1989; ibid, vol. 86, page 1544; J.A.C.S. 72, 3079 (1950); and Annalen der Chemie, vol. 567, page 31 (1950)], followed by reduction with either hydrogen and Raney nickel (α-form) or sodium in ethanol (β- or pseudo-form).

An N-substituted norscopoline may be prepared pursuant to Zeile and Heusner, Chem. Berichte 90, 2800 and 2809 (1957) from the corresponding amine.

An N-substituted norteloidine is obtained in a manner analogous to that described by Schöpf and Arnold in Annalen der Chemie 558, 109 (1947), using an analogous amine.

Finally, an N-substituted 6-hydroxy-nortropine may be prepared from the corresponding amine pursuant to A. Stoll, B. Becker, E. Jucker, Helvst. Chim. Acta 35, 1263 (1952); P. Nedenskov, N. Clauson-Kaas, Acta chem. scand. 8, 1295 (1954); J. C. Sheehan, B. M. Bloom, J.A.C.S. 74, 3825 (1952).

The following examples further illustrate the present invention and will enable others skilled in the art to understand it more completely.

Example 1

Preparation of atropine (a) 500 mgm. of crystalline sodium methylate were added to 500 cc. of toluene, and the mixture was heated to the boiling point. While continuously stirring, a solution of 58.8 gm. (0.33 mol.) of α-formyl-phenylacetic acid methyl ester in 250 cc. of toluene and a solution of 35.3 gm. (0.25 mol.) of tropine in 250 cc. of toluene were simultaneously added dropwise to the boiling sodium methylate suspension, and at the same time a toluene-methanol mixture was slowly distilled off. The temperature of the heating bath was maintained throughout that time at about 135° C. After all of each of the solutions had been added, an additional 500 cc. of toluene were added dropwise, which were distilled off at the same rate. After completion of the reaction the mixture was allowed to cool overnight, the precipitate formed thereby was collected by vacuum filtration, and the filter cake was washed first with toluene and then several times with acetone and then dried at 100° C. in vacuo. 57.5 gm. (79.8% of theory) of α-formyl-phenylacetic acid tropine ester, M.P. 222–223° C. (decomposition), were obtained.

(b) 28.7 gm. (0.1 mol.) of α-formyl-phenylacetic acid tropine ester were suspended in a mixture of methylene chloride and methanol, and 1.9 gm. (0.05 mol.) of sodium borohydride were added to the suspension at 20° C. in three equal portions over a period of 45 minutes. When the last portion of sodium borohydride was added, the α-formyl-phenylacetic acid tropine ester went into solution. The solution was stirred for one hour, 50 cc. of water were then added, and the aqueous mixture was vigorously stirred for fifteen minutes more. Thereafter, the organic phase was separated and dried with sodium sulfate, and solvent was distilled off. The residue was recrystallized from acetone, yielding 26.3 gm. (91.0% of theory) of atropine, M.P. 115–116° C.

EXAMPLE 2

(a) 500 cc. of toluene were heated to the boiling point and, while continuously stirring the boiling toluene, a solution of 58.8 gm. (0.33 mol) of α-formyl-phenylacetic acid methyl ester in 250 cc. of toluene and a solution of 35.3 gm. (0.25 mol.) of tropine in 250 cc. of toluene were simultaneously added dropwise thereto. During the addition of the solutions a mixture of toluene and methanol was continuously distilled off, taking care that the temperature of the heating bath did not rise above 135° C. After all of each of the solutions had been added, 500 cc. of toluene were added over a period of one and a half hours while distilling it off at the same rate. Upon completion of the reaction, the reaction solution was allowed to cool overnight, and the precipitate formed thereby was collected on a vacuum filter. The filter cake was washed first with toluene and then several times with acetone, yielding moist α-formyl-phenylacetic acid tropine ester.

(b) 28.7 gm. (0.1 mol) of the moist α-formyl-phenyl acetic acid tropine ester were dissolved in 100 cc. of 1 N hydrochloric acid, and 20 cc. of 1.5 N ammonia were added thereto, whereby the pH of the solution was raised to 7. 150 cc. of methylene chloride were added, and then 1.9 gm. (0.05 mol) of sodium borohydride were introduced in five equal portions over a period of fifty minutes at 20° C. The reaction solution was then stirred for fifteen minutes to allow the reaction to go to completion. Thereafter, the pH of the reaction mixture was adjusted to 10 with 2 N sodium hydroxide, the methylene chloride phase was separated after a short period of stirring, and the aqueous phase was extracted three times with methylene chloride. The methylene chloride solutions were combined and dried over sodium sulfate, the methylene chloride was distilled off, and the residue was recrystallized from acetone and dried at 60° C. 23.9 gm. (82.7% of theory) of atropine, M.P. 114–115° C. were obtained.

EXAMPLE 3

143.7 gm. (0.5 mol) of α-formyl-phenylacetic acid tropine ester were suspended in a mixture of 200 cc. of water and 800 cc. of methylene chloride. 5.4 gm. of sodium borohydride were added to the suspension at 20° C. while vigorously stirring and then, at intervals of one hour, 5.4 gm.-portions of sodium borohydride were stirred into the reaction mixture three times, whereby the α-formyl-phenylacetic acid tropine ester gradually went into solution. After a total reaction time of six hours the methylene chloride phase was separated, the aqueous phase was extracted five times with 100 cc.-portions of methylene chloride, the methylene chloride solutions were combined, dried over sodium sulfate, and the methylene chloride was distilled off. The residue was stirred with acetone, cooled to 0° C., the crystalline product formed thereby was collected on a vacuum filter, and the filter cake was washed with a mixture of acetone and petroleum ether and dried at 60° C. in vacuo. 122.7 gm. (84.8% of theory) of pure, white atropine, M.P. 114–115° C., were obtained.

EXAMPLE 4

(a) 62.5 liters of toluene and 17 gm. of sodium methylate were placed into a 100 liter vessel provided with a stirrer, and the mixture was heated to the boiling point. A solution of 7.05 kg. of tropine in 62.5 liters of toluene and a solution of 11.6 kg. of α-formyl-phenylacetic acid methyl ester in 62.5 liters of toluene were simultaneously allowed to run slowly into the boiling contents of the vessel, while stirring. During that time a mixture of toluene and methanol was continuously distilled off at a rate such that an approximately constant amount of solvent was present in the reaction vessel. The temperature in the reaction mixture was maintained between 100 and 115° C. After all of each of the solutions had been added, 20 liters more of toluene were slowly added to the reaction solution while distilling the solvent off at the same rate. Thereafter, the residue remaining in the reaction vessel was stirred until it was cool, the crystalline precipitate formed thereby was collected by vacuum filtration, and the filter cake was washed with 10 liters of toluene, recrystallized from acetone and dried in a drying chamber. 12.9 kg. (89.8% of theory) of α-formyl-phenylacetic acid tropine ester, M.P. 197.5–198.5° C., were obtained.

(b) 48 liters of methylene chloride, 12 liters of water and 8.62 kg. of α-formyl-phenylacetic acid tropine ester were placed into a 100 liter vessel provided with a stirrer, and to the suspension formed thereby 1.36 kg. of sodium borohydride were introduced over a period of three hours at a temperature of 20–25° C. The hydrogen evolved by the reaction was continuously sucked off. After the reaction had gone to completion the methylene chloride phase was separated, and the aqueous phase was washed first with 15 liters and then with 7 liters of methylene chloride in a stationary vessel having a capacity of 100 liters. The organic phases were combined, washed by stirring with 20 liters of water, and dried over sodium sulfate. The methylene chloride was distilled off, and the residue was crystallized from acetone, collected by vacuum filtration, washed with acetone and dried in a drying chamber. 7.1 kg. (81.7% of theory) of atropine, M.P. 111–112° C., were obtained.

EXAMPLE 5

Preparation of d,l-scopolamine

A solution of 53.5 gm. (0.3 mol) of α-formyl-phenyl-acetic acid methyl ester in 250 cc. of toluene and a solution of 31.0 gm. (0.2 mol) of scopine in 250 cc. of toluene were simultaneously added dropwise to a boiling suspension of 500 mgm. of sodium methylate in 500 cc. of toluene, while at the same time continuously distilling off a toluene-methanol mixture (B.P. 108–110° C.). After all of each of the solutions had been added, 500 cc. more of toluene were added dropwise while at the same time distilling off toluene at the same rate. The resulting toluene solution containing α-formyl-phenylacetic acid scopine ester was concentrated to 300 cc. in vacuo, and 100 cc. of water was added. The aqueous mixture was then of water was added. The aqueous mixture was then admixed with a total of 15.1 gm. (0.4 mol) of sodium borohydride over a period of four hours while tumbling the reaction vessel, one-fourth of the total amount being added at hourly intervals. Thereafter, the aqueous phase was separated, extracted several times with chloroform, and the extract solutions were combined with the toluene phase. The combined organic phases were dried, and the chloroform and toluene were distilled off, leaving 47.4 gm. (78.2% of theory) of a colorless oil, which was taken up in ethanol. The ethanolic solution was neutralized with 1 N hydrobromic acid and evaporated to dryness. The residue was recrystallized once from a mixture of ethanol and ether, yielding 59.4 gm. of d,l-scopolamine, M.P. 180–182° C. After being recrystallized twice more from ethanol/ether, the melting point rose to 183–185° C. (literature M.P.=185–186° C.; King, J. Chem. Soc. 115 (1921) 478 and 505). The paper-chromatogram and infrared spectrum of the product were identical to those of a known sample of racemic scopolamine.

EXAMPLE 6

Using a procedure analogous to that described in Example 1, 13.8% of theory of N-propargyl-nortropine-tropic acid ester hydrochloride, M.P. 172–174° C. (recrystallized from isopropanol), were obtained from raw N-propargyl-nortropine (dark brown crystals) through N-propargyl-nortropine-α-fromyl-phenylacetic acid ester, dark brown crystals, M.P. 132–134° C. (raw product, yield 23.7% of theory).

EXAMPLE 7

Using a procedure analogous to that described in Example 1, 71.2% of theory of N-amyl-nortropine-tropic acid ester hydrochloride, white crystals, M.P. 161–162° C. (recrystallized from acetonitrile), was obtained from N-amyl-nortropine (light yellow oil, B.P. 130–131° C. at 0.1 mm. Hg) through N-amyl-nortropine-α-formyl-phenylacetic acid ester (raw product: yellow crystals, M.P. 130–131° C., yield 61.8% of theory).

EXAMPLE 8

Using a procedure analogous to that described in Example 1, 41.4% of theory of N-isoamyl-nortropine-tropic acid ester hydrochloride, white crystals, M.P. 168–170° C., were obtained from N-isoamyl-nortropine (colorless oil, B.P. 103–105° at 0.1 mm. Hg) through N-isoamyl-nortropine-α-formyl-phenylacetic acid ester (raw product: yellow crystals, M.P. 157–158° C., yield 80.9% of theory).

EXAMPLE 9

Using a procedure analogous to that described in Example 1, 18.6% of theory of N-hexyl-nortropine-tropic acid ester hydrochloride, white crystals, M.P. 144–147° C. (recrystallized from acetone), was obtained from N-hexyl-nortropine (colorless oil, B.P. 125–127° C. at 0.01 mm. Hg) through N-hexyl-nortropine-α-formyl-phenylacetic acid ester (raw product: yellow crystals, M.P. 171–173° C., yield 74.5% of theory).

Reaction of N-hexyl-nortropine-tropic acid ester hydrochloride with acetyl chloride yielded 41.8% of theory of O-acetyl-N-hexyl-nortropine-tropic acid ester hydrochloride, white crystals precipitated with ether, M.P. 179–181° C.

EXAMPLE 10

Using a procedure analogous to that described in Example 1, 56.6% of theory of N-heptyl-nortropine-tropic acid ester hydrochloride, white crystals (recrystallized from acetonitrile), was obtained from N-heptyl-nortropine (colorless oil, B.P. 130–131° C. at 0.01 mm. Hg) through N-heptyl-nortropine-α-formyl-phenylacetic acid ester (raw product: yellow crystals, M.P. 122–12° C., yield 53.4% of theory).

EXAMPLE 11

Using a procedure analogous to that described in Example 1, 65.6% of theory of N-octyl-nortropine-tropic acid ester hydrochloride, white crystals, M.P. 139–140° C. (recrystallized from acetonitrile), was obtained from N-octyl-nortropine (light yellow oil, B.P. 132–134° C. at 0.005 mm. Hg) through N-octyl-nortropine-α-formyl-phenylacetic acid ester (raw product: yellow crystals, M.P. 110–111° C., yield 77% of theory).

EXAMPLE 12

Using a procedure analogous to that described in Example 1, 70% of theory of N-nonyl-nortropine-tropic acid ester hydrochloride, white crystals, M.P. 137–139° C. (recrystallized from acetonitrile), was obtained from N-nonyl-nortropine (raw product, light yellow oil) through N-nonyl-nortropine - α - formyl-phenylacetic acid ester (raw product: yellow crystals, M.P. 98–99° C., yield 73.4% of theory).

EXAMPLE 13

Using a procedure analogous to that described in Example 1, 59.5% of theory of N-decyl-nortropine-tropic acid ester hydrochloride, white crystals, M.P. 132–133° C. (recrystallized from acetonitrile), was obtained from N-decyl-nor-tropic (raw product, yellow oil) through N-decyl-nortropine-α-formyl-phenylacetic acid ester (raw product: yellow crystals, M.P. 89–93° C., yield 53.3% of theory).

EXAMPLE 14

Using a procedure analogous to that described in Example 1, 66.7% of theory of N-undecyl-nortropine-tropic acid ester hydrochloride, white crystals, M.P. 117–120° C. (recrystallized from acetonitrile), was obtained from N-undecyl-notropine (raw product, brown oil) through N-undecyl-notropine-α-formyl-phenylacetic acid ester (raw product: yellow crystals, M.P. 96–98° C., yield 60.9% of theory).

EXAMPLE 15

Using a procedure analogous to that described in Example 1, 76.2% of theory of N-dodecyl-nortropine-tropic acid ester hydrochloride, white crystals, M.P. 129–131° C. (recrystallized from acetonitrile), was obtained from N-dodecyl-nortropine (raw product, brown oil) through N-dodecyl-nortropine-α-formyl-phenylacetic acid ester (raw product: yellow crystals, M.P. 100–102° C., yield 95.3% of theory).

EXAMPLE 16

Using a procedure analogous to that described in Example 1, 79.4% of theory of N-cetyl-nortropine-tropic acid ester hydrochloride, white crystals, M.P. 123–124° C. (recrystallized from acetonitrile), was obtained from N-cetyl-nortropine (raw product, brown oil) through N-cetyl-nortropine-α-formyl-phenylacetic acid ester (raw product: yellow crystals, M.P. 82–84° C., yield 77.5% of theory).

EXAMPLE 17

Using a procedure analogous to that described in Example 1, 65.1% of theory of N-(cyclohexyl-methyl)-nortropine-tropic acid ester hydrochloride, white crystals, M.P. 173–176° C. (recrystallized from acetone), was obtained from N-(cyclohexyl-methyl)-nortropine (raw product: yellow crystals, M.P. 108–109° C.) through N-(cyclohexyl - methyl) - nortropine-α-formyl-phenylacetic acid ester (raw product: yellow crystals, M.P. 170–171° C., yield 91% of theory).

EXAMPLE 18

Using a procedure analogous to that described in Example 1, 63.0% of theory of N-(p-chlorobenzyl)-nortropine-tropic acid ester hydrochloride, white crystals, M.P. 204–207° C. (recrystallized from ethanol), was obtained from N-(p-chlorobenzyl)-nortropine (raw product, yellow crystals) through N-(p-chlorobenzyl)-nortropine-α-formyl-phenylacetic acid ester (raw product: yellow crystals, M.P. 134–138° C., yield 75.4% of theory).

EXAMPLE 19

Using a procedure analogous to that described in Example 1, N-isopropyl-nortropine-tropic acid ester hydrochloride was obtained from N-isopropyl-nortropine through N - isopropyl - nortropine-α-formyl-phenylacetic acid ester.

Reaction of N-isopropyl-nortropine-tropic acid ester hydrochloride with acetyl chloride yielded 62.0% of theory of O-acetyl-N-isopropyl-nortropine-tropic acid ester hydrochloride, white crystals, M.P. 150–152° C. (recrystallized from isopropanol).

Reaction of N-isopropyl-nortropine-tropic acid ester hydrochloride with benzoyl chloride yielded 60.6% of theory of O-benzoyl-N-isopropyl-nortropine-tropic acid ester hydrochloride, white crystals, M.P. 178–179° C. (recrystallized from acetonitrile).

EXAMPLE 20

Using a procedure analogous to that described in Example 1, 80.8% of theory of N-isopropyl-pseudonortropine-tropic acid ester hydrochloride, white crystals, M.P. 152–154° C. (recrystallized from isopropanol), was obtained from N-isopropyl-pseudonortropine (yellow crystals, M.P. 113–117° C. from ethyl acetate) through N-isopropyl-pseudonortropine-α-formyl-phenylacetic acid ester (yellow crystals, M.P. 203° C. from toluene, yield 79.3% of theory).

In analogous fashion, the following additional compounds of the Formula I were prepared by the process according to the invention:

N-ethyl-nortropine, yield: 75% of theory;
   M.P. of base: 67–70° C.;
   M.P. of hydrochloride: 151–153° C.;
   M.P. of hydrobromide: 195–196° C.
N-n-propyl-noratropine, yield: 78% of theory:
   M.P. of hydrochloride: 161–162° C.;
   M.P. of hydrobromide: 160–161.5° C.
N-isopropyl-noratropine, yield: 76% of theory;
   M.P. of base: 114–116° C.;
   M.P. of hydrochloride: 196–198° C.
   M.P. of hydrobromide: 221–223° C.
N-n-butyl-noratropine, yield: 66.2% of theory;
   M.P. of hydrochloride: 159–161° C.

N-allyl-noratropine, yield: 54.5% of theory;
   M.P. of base: 75–77° C.;
   M.P. of hydrochloride: 144–146° C.
N-cyclopropyl-noratropine, yield: 72.0% of theory;
   M.P. of hydrochloride: 166–167° C.
N-cyclohexylnoratropine, yield: 75.0% of theory;
   M.P. of base: 96–198° C.;
   M.P. of hydrochloride: 197–199° C.
N-cyclooctyl-noratropine, yield: 87.0% of theory;
   M.P. of base: 114–116° C.;
   M.P. of hydrochloride: 215–217° C.
Pseudoatropine, yield: 86.5% of theory;
   M.P. of hydrochloride: 198–199° C.
(—)-N-ethyl-norscopolamine, yield: 80.1% of theory;
   M.P. of hydrochloride: 188–190° C.;
   $[\alpha]_D^{21} = -26.3°$ (c.=2.0).
(—)-N-propyl-norscopolamine, yield: 83.0 of theory;
   M.P. of hydrochloride: 177–178° C.;
   $[\alpha]_D^{20} = -30°$ (c.=2.0).
(±)-N-isopropyl-norscopolamine, yield: 18% of theory;
   M.P. of hydrochloride: 213–214° C. (decomposition).
(—)-N-isopropyl-norscopolamine, yield: 27.1% of theory;
   M.P. of hydrochloride: 214–216° C. (decomposition); $[\alpha]_D^{20} = -27.3°$.
(±)-N-butyl-norscopolamine, yield: 24.5% of theory;
   M.P. of hydrochloride: 133–134° C.
(—)-N-butyl-norscopolamine, yield: 51.5% of theory;
   M.P. of hydrochloride: 146–148° C.;
   $[\alpha]_D^{20} = -28.5°$ (c.=2.0).
(—)-N-amyl-norscopolamine, yield: 81.3% of theory;
   M.P. of hydrochloride: 160–162° C.;
   $[\alpha]_D^{21} = -29.5°$ (c.=2.0).
(—)-N-isoamyl-norscopolamine, yield: 86.7% of theory;
   M.P. of hydrochloride: 186–188° C.;
   $[\alpha]_D^{20} = -28.0°$ C.
(±)-N-hexyl-norscopolamine, yield: 10.0% of theory;
   M.P. of hydrochloride: 153° C.
(—)-N-hexyl-norscopolamine, yield: 55.5% of theory;
   M.P. of hydrobromide: 150–152° C.;
   $[\alpha]_D^{20} = -25°$ (c.=2.0).
(—)-N-hexyl-O-acetyl-norscopolamine, yield: 53.6% of theory;
   M.P. of hydrochloride: 126–127° C.
(—)-N-cetyl-norscopolamine, yield: 61% of theory;
   M.P. of hydrochloride: 151–152° C.
(—)-N-allyl-norscopolamine, yield: 49% of theory;
   M.P. of hydrochloride: 165–166° C.;
   $[\alpha]_D^{20} = -27.5°$.
(—)-N-benzyl-norscopolamine, yield: 94.5% of theory;
   M.P. of base: 85–86° C.
(—)-N-4-phenylbenzyl-norscopolamine, yield: 96.5% of theory;
   M.P. of hydrochloride: 215° C. (decomposition).

EXAMPLE 21

Preparation of N-methyl-granatanol-tropic acid ester (a) A solution of 77.5 gm. (0.5 mol) of N-methyl-granatanol in 625 cc. of absolute toluene and a solution of 116 gm. (0.65 mol) of α-formyl-phenylacetic acid methyl ester in 625 cc. of absolute toluene were added simultaneously dropwise over a period of eight hours to a boiling suspension of 500 mgm. of crystalline sodium methylate in 625 cc. of absolute toluene. During this entire period the reaction mixture was boiled at such a rate that the volume of the solutions added thereto was exactly equal to the amount of toluene-methanol mixture being distilled off, so that the volume of the reaction mixture remained the same. After completion of the reaction, the reaction solution was allowed to cool overnight. The viscous brown oil which separated out during this cooling period was separated from the supernatant toluene solution and was briefly heated on a water bath with 400 cc. of acetone.

Upon cooling of this acetone solution, 70 gm. (46.6% of theory) of α-formyl-phenylacetic acid-N-methyl-granatanol ester, M.P. 174° C., crystallized out.

(b) 60 gm. (0.2 mol) of α-formyl-phenylacetic acid N-methyl-granatanol ester were suspended in a mixture of 300 cc. of methylene chloride and 80 cc. of water, and then 9.1 gm. (0.24 mol) of sodium borohydride were introduced into this suspension at about 20° C. over a period of three hours in small portions. The α-formyl-phenylacetic acid N-methyl-granatanol ester gradually went into solution. After all of the sodium borohydride had been added, the reaction solution divided into two liquid phases, and this 2-phase system was stirred for one hour. Thereafter, the upper layer (aqueous solution) was separated and was extracted twice with 50 cc.-portions of methylenechloride. The methylenechloride extracts were combined, extracted with water, dried over magnesium sulfate, and the solvent was distilled off. The residue was dissolved in acetone, and the substance which crystallized out was separated by vacuum filtration. 44.8 gm. (74% of theory) of N-methyl-granatanol-tropic acid ester, M.P. 102–103° C., were obtained. Its hydrochloride had an M.P. of 172–173° C.

EXAMPLE 22

Using a procedure analogous to that described in Example 21, 20.2% of theory of N-propargyl-granatoline-tropic acid ester hydrochloride, brown-speckled crystals, M.P. 189–191° C. (recrystallized from acetonitrile), was obtained from N-propargyl-granatoline (raw product, brown oil) through N-propargyl-granatoline-α-formyl-phenylacetic acid ester (raw product, yellow crystals M.P. 120–122° C., yield 27.8% of theory).

EXAMPLE 23

Using a procedure analogous to that described in Example 21, 58.2% of theory of N-amyl-granatoline-tropic acid ester hydrochloride, white crystals, M.P. 165–166° C. (recrystallized from acetonitrile), was obtained from N-amyl-granatoline (raw product, light yellow oil, B.P. 120–121° C. at 0.1 mm. Hg) through N-amyl-granatoline-α-formyl-phenylacetic acid ester (raw product, yellow crystals, yield 90.5% of theory).

EXAMPLE 24

Using a procedure analokous to that described in Example 21, 47% of theory of N-isoamyl-granatoline-tropic acid ester hydrochloride, white crystals, M.P. 173–174° C. (recrystallized from acetonitrile/ether), was obtained from N-isoamyl-granatoline (light yellow oil, B.P. 115–116° C. at 0.01 mm. Hg) through N-isoamyl-granatoline-α-formyl-phenylacetic acid ester (raw product, yellow crystals, yield 79% of theory).

EXAMPLE 25

Using a procedure analogous to that described in Example 21, 61% of theory of N-hexyl-granatoline-tropic acid ester hydrochloride, white crystals, M.P. 167–168° C. (recrystallized from acetone), was obtained from N-hexyl-granatoline (yellow oil, B.P. 141–143° C. at 0.05 mm. Hg) through N-hexyl-granatoline-α-formyl-phenylacetic acid ester (raw product, yellow crystals, yield 82.2% of theory).

Reaction of N-hexyl-granatoline-tropic acid ester hydrochloride with acetyl chloride yielded 59.4% of theory of O-acetyl-N-hexyl-granatoline-tropic acid ester hydrochloride, white crystals, M.P. 198–201° C. (recrystallized from acetonitrile).

EXAMPLE 26

Using a procedure analogous to that described in Example 21, 38% of theory of N-heptyl-granatoline-tropic acid ester hydrochloride, white crystals, M.P. 140–141° C. (recrystallized from acetone), was obtained from N-heptyl-granatoline (yellow oil, B.P. 162–165° C. at 0.1 mm. Hg) through N-heptyl-granatoline-α-formyl-phenylacetic acid ester (raw product, yellow crystals, yield 31.2% of theory).

EXAMPLE 27

Using a procedure analogous to that described in Example 21, 41.5% of theory of N-octyl-granatoline-tropic acid ester hydrochloride, white crystals, M.P. 140–142° C. (recrystallized from acetonitrile), was obtained from N-octyl-granatoline (brown oil) through N-octyl-granatoline-α-formyl-phenylacetic acid ester (raw product, yellow crystals, yield 80% of theory).

EXAMPLE 28

Using a procedure analogous to that described in Example 21, 51.8% of theory of N-nonyl-granatoline-tropic acid ester hydrochloride, white crystals, M.P. 140–141° C. (recrystallized from acetonitrile), was obtained from N-nonyl-granatoline (raw product, brown oil) through N-nonyl-granatoline-α-formyl-phenylacetic acid ester (raw product, yellow crystals, M.P. 95–98° C., yield 59% of theory).

EXAMPLE 29

Using a procedure analogous to that described in Example 21, 56.7% of theory of N-decyl-granatoline-tropic acid ester hydrochloride, white crystals, M.P. 130–132° C. (recrystallized from acetone), was obtained from N-decyl-granatoline (raw product, brown oil) through N-decyl-granatoline-α-formyl-phenylacetic acid ester (raw product, yellow crystals, M.P. 90–93° C., yield 72.5% of theory).

EXAMPLE 30

Using a procedure analogous to that described in Example 21, 70% of theory of N-undecyl-granatoline-tropic acid ester hydrochloride, white crystals, M.P. 122–124° C. (recrystallized from acetone), was obtained from N-undecylgranatoline (raw product, brown oil) through N-undecyl-granatoline-α-formyl-phenylacetic acid ester (raw product, yellow crystals, M.P. 105–108° C., yield 67.5% of theory).

EXAMPLE 31

Using a procedure analogous to that described in Example 21, 76.5% of theory of N-dodecyl-granatoline-tropic acid ester hydrochloride, white crystals, M.P. 132–133° C. (recrystallized from acetone), was obtained from N-dodecylgranatoline (raw product, brown oil) through N-dodecyl-granatoline-α-formyl-phenylacetic acid ester (raw product, yellow crystals, M.P. 98–100° C., yield 80% of theory).

EXAMPLE 32

Using a procedure analogous to that described in Example 21, 75% of theory of N-cetyl-granatoline-tropic acid ester hydrochloride, white crystals, M.P. 127–128° C. (recrystallized from acetone), was obtained from N-cetylgranatoline (raw product, brown oil) through N-cetyl-granatoline-α-formyl-phenylacetic acid ester (raw product, yellow crystals, M.P. 84–86° C., yield 73.4% of theory).

EXAMPLE 33

Using a procedure analogous to that described in Example 21, 35% of theory of N-cyclohexyl-methyl-granatoline-tropic acid ester hydrochloride, white crystals, M.P. 163–165° C. (recrystallized from acetone), was obtained from N-(cyclohexyl-methyl)-granatoline (raw product, yellow oil) through N-cyclohexyl-methyl-granatoline-α-formyl-phenylacetic acid ester (raw product, yellow crystals, M.P. 120° C., yield 82.5% of theory).

EXAMPLE 34

Using a procedure analogous to that described in Example 21, 10.5% of theory of N-(p-chloro-benzyl)-granatoline-tropic acid ester hydrochloride, white crystals, M.P. 218–220° C. (recrystallized from ethanol/ether), was obtained from N-(p-chloro-benzyl)-granatoline (raw product, brown oil) through N-(p-chloro-benzyl)-granatoline-α-formyl-phenylacetic acid ester (raw product, brown oil, yield 98% of theory).

EXAMPLE 35

Using a procedure analogous to that described in Example 21, N-isopropyl-granatoline-tropic acid ester hydrochloride was obtained from N-isopropyl-granatoline through N - isopropyl-granatoline-α-formyl-phenylacetic acid ester.

Reaction of N-isopropyl-granatoline-tropic acid ester hydrochloride with benzoyl chloride yielded O-benzoyl-N-isopropyl-granatoline-tropic acid ester hydrochloride, white crystals, M.P. 178–180° C., (recrystallized from acetonitrile).

EXAMPLE 36

Using a procedure analogous to that described in Example 21, 74% of theory of N-isopropyl-pseudogranatoline-tropic acid ester hydrochloride, white crystals, M.P. 143–144° C., was obtained from N-isopropyl-pseudogranatoline (yellowish crystals, M.P. 89–90° C. recrystallized from ethyl acetate) through N-isopropyl-pseudogranatoline-α-formyl-phenylacetic acid ester (yellow crystals, M.P. 141–143° C. recrystallized from toluene/acetone, yield 79% of theory).

In analogous fashion, the following additional compounds of the Formula I were prepared:

N-ethyl-granatanol-tropic acid ester, yield: 54% of theory;
    M.P. of base: 62–64° C.
    M.P. of hydrochloride: 161–163° C.
N-n-propyl-granatanol-tropic acid ester, yield: 47% of theory:
    M.P. of base: 70–72° C.
    M.P. of hydrochloride: 134–136° C.
N-isopropyl-granatanol-tropic acid ester, yield: 54.2% of theory;
    M.P. of base: 110–111° C.
    M.P. of hydrochloride: 173–174° C.
N-n-butyl-granatanol-tropic acid ester, yield: 57% of theory;
    M.P. of base: 62–64° C.
    M.P. of hydrochloride: 146–148° C.
N-n-propyl-pseudogranatanol-tropic acid ester, yield: 77% of theory;
    M.P. of hydrochloride: 178–180° C.

EXAMPLE 37

Preparation of 6,7-dehydroatropine (a) α-Formyl - phenylacetic acid tropen-(6) - ol - (3ᵃ) ester—A solution of 10 gm. (0.072 mol) of tropen-(6)-ol-(3α) in 90 cc. of absolute toluene and a solution of 16.25 gm. (0.093 mol) of crystalline α-formyl-phenylacetic acid methyl ester in 90 cc. of absolute toluene were added simultaneously dropwise to a boiling suspension of 83 mg. of sodium methylate in 90 cc. of absolute toluene over a period of several hours, while stirring, at such a rate that the same volume of a toluene-methanol mixture distilled off. Thereafter, the reaction solution was refluxed for one hour more. Subsequently, the reaction solution was substantially evaporated, and the residue was admixed with acetone. The substance which crystallized out upon scratching of the acetone solution was collected on a vacuum filter and was washed several times with acetone. 14.5 gm. (70.9% of theory) of α-formyl-phenylacetic acid tropen-(6)-ol-(3ᵃ) ester, slightly yellow crystals, M.P. 161–163° C. (decomposition), were obtained.

(b) 6,7-dehydroatropine.—11.4 gm. (0.04 mol) of the α-formyl-phenylacetic acid tropen-(6)-ol-(3ᵃ) ester obtained in (a) above were suspended in a mixture of 60 cc. of methylenechloride and 16 cc. of water, and 1.8 gm. (0.048 mol) of sodium borohydride were added to this suspension at room temperature over a period of two to three hours in small portions, accompanied by vigorous stirring. As the reduction progressed, the formyl ester gradually went into solution. Thereafter, the solution was stirred for one hour more. Subsequently, the organic phase was separated, washed twice with 20 cc.-portions of water, dried with anhydrous sodium sulfate, filtered through charcoal, and then evaporated in vacuo. The residue was recrystallized with acetone, yielding 9.8 gm. (85.4% of theory) of pure 6,7-dehydroatropine having a melting point of 102–105° C. Its tartrate had a melting point of 139–141° C. (recrystallized from ethanol). Its picrate had a melting point of 155–157° C. (recrystallized from ethanol).

EXAMPLE 38

4.0 gm. of 6,7-dehydroatropine were dissolved in the calculated amount of methanolic hydrochloric acid, and the solution was evaporated in vacuo. The residue was admixed with 28 cc. of benzoylchloride, and the mixture was heated for two hours at 110–115° C. and allowed to cool. Thereafter, the reaction mixture was admixed with ether, whereby an oily substance separated out which crystallized after a short time. The crystalline mass was recrystallized several times from ethylacetate, yielding analytically pure O-benzoyl-6,7-dehydroatropine hydrochloride in the form of white crystals having a melting point of 149–151° C.

EXAMPLE 39

Using a procedure analogous to that described in Example 37, N-ethyl-nortropene-6-ol-3α tropic acid ester was obtained from N-ethyl-nortropene-(6)-ol-(3α). The raw ester base was converted into its hydrochloride, which was obtained in the form of white crystals, M.P. 172–173° C. (recrystallized from acetone).

The N-ethyl-nortropen-(6) - ol - (3α) - α-formyl-phenylacetic acid ester obtained as an intermediate product had a melting point of 171–174° C. (raw product).

The n-ethyl-nortropen-(6)-ol-(3α) used as the starting compound was obtained by alkylation of the norbase with ethylbromide; M.P. 104–106° C. at 13 mm. Hg. (M.P. 56.5 to 58° C.). The nor-base, nortropen-(6)-ol-(3α), was prepared by demethylation of 3α-acteoxy-tropene-(6) by means of phosgene through N-chlorocarbonyl-3α-acetoxy-nortropene-(6), M.P. 85–86° C., and subsequent hydrolysis. The nortropen-(6)-ol-(3α) hydrochloride obtained thereby had a melting point of 279–280° C. (decomposition), and the free base isolated therefrom had a melting point of 175.5–176.5° C. after recrystallization from cyclohexane.

EXAMPLE 40

Preparation of pseudo-6,7-dehydroatropine hydrochloride (a) Tropen - (6) - ol - (3β)-α-formyl-phenylacetic acid ester (raw product) was obtained in a manner analogous to that described in Example 37a, but starting from the isomeric tropen-6-ol-(3β) in place of tropen-(6)-ol-(3α). M.P. 225–227° C. (decomposition).

(b) 8.0 gm. (0.028 mol) of the formyl ester obtained in (a) above were dissolved in a mixture of 27.85 cc. of 1 N hydrochloric acid and 120 cc. of methylenechloride, and the solution was admixed with 5.57 gm. (0.146 mol) of sodium borohydride in an open vessel over a period of thirty minutes at room temperature, accompanied by thorough stirring with a magnetic stirrer. After all of the sodium borohydride had been added, the reaction mixture was stirred for fifteen minutes more, the organic phase was separated and washed twice with water, and the dried methylenechloride solution was evaporated in a water aspirator vacuum. The residue was distributed between a mixture of 2 N hydrochloric acid and ether. The acid aqueous phase was separated and made alkaline with ammonia and was extracted several times with methylenechloride. The organic extracts were combined, dried, and the dry solution was evaporated in vacuo. The residue was dissolved in ether, the solution was purified with charcoal and then acidified with methanolic hydrochloric acid. The precipitate formed by adding more ether to the acid solution was initially oily but soon crystallized, and was recrystallized from isopropanol. Pseudo-6,7-dehydroatropine hydrochloride was obtained in the form of white crystals having a melting point of 169–172° C.

The process according to the present invention may be used to prepare known compounds as well as previously unknown compounds. Prior methods for the preparation of the known compounds have been difficult to carry out, produced relatively poor yields, and often led to impure products.

In contrast thereto, the process of the instant invention is easy to perform on an industrial scale and produces very good yields of the end products. Moreover, it permits the easy preparation of N-substituted compounds of the Formula I which have heretofore been inaccessible or very difficult to prepare.

The heretofore unknown racemic compounds embraced by Formula I above, their optically active stereoisomers and the non-toxic, pharmacologically acceptable acid addition salts of the racemates or stereoisomers have useful pharmacodynamic properties. More particularly, they exhibit central anti-cholinergic and spasmolytic activities in warm-blooded animals, and in addition are very effective in the treatment of Parkinson's disease.

For pharmaceutical purposes these previously unknown compounds above referred to are administered perorally or parenterally to warm-blooded animals as active ingredients in customary dosage unit compositions, that is, compositions in dosage unit form consisting essentially of an inert pharmaceutical carrier and one dosage unit of the active ingredient, such as tablets, coated pills, capsules, wafers, solutions, suspensions, emulsions, syrups, powders, suppositories and the like. One dosage unit of the compounds in question is from 0.08 to 3.4 mgm./kg. body weight. Such dosage unit compositions may also contain one or more other pharmacologically active ingredients.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. In the process for preparing a compound of the formula $$\begin{array}{c} CH\!-\!-\!CH_2 \\ R_1\!\diagup\!\!\!\!\!\!N\!-\!R_2\;\;CH\!-\!OOC\!-\!CH\!-\!C_6H_5 \\ \diagdown\!\!\!\!\!\!CH\!-\!-\!CH_2\quad\quad\quad CHO \end{array}$$

wherein $R_1$ is $-(CH_2)_2-$, $-(CH_2)_3-$, $-CH=CH-$, $$-CH\!-\!CH-\!\!\!\diagdown O\diagup$$

$-CHOH-CH_2-$, $-CHOCH_3-CH_2-$ or $-CHOH-CHOH-$ and $R_2$ is straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl, which consists of subjecting an alcohol of the formula $$R_5OH$$

wherein $R_5$ is $$\begin{array}{c} CH\!-\!-\!CH_2 \\ R_1\!\diagup\!\!\!\!\!\!N\!-\!R_2\;\;CH- \\ \diagdown\!\!\!\!\!\!CH\!-\!-\!CH_2 \end{array}$$

or $$\begin{array}{c} -CH\!-\!CH\!-\!-\!CH_2 \\ \phantom{-CH\!-}\;\;N\!-\!R_2\;\;CH\!-\!\!\!\!\rceil \\ CH\!-\!CH\!-\!-\!CH_2\!\underset{\!-\!\!\!\!\!\!-\!\!\!\!\!\!O}{\rfloor} \end{array}$$

where $R_1$ and $R_2$ have the meanings previously defined, to an ester interchange reaction with an α-formyl-phenyl-acetic acid lower alkyl ester in the presence of an inert organic solvent, the improvement which consists of heating said solvent to the boiling point, simultaneously adding to said boiling solvent a solution of said α-formyl-phenyl-acetic acid lower alkyl ester in said solvent and a solution of said alcohol in said solvent while continuously distilling off a vapor mixture consisting of said solvent and a lower alkanol at substantially the same volumetric rate as said solutions are being added, and recovering the reaction product from the reaction mixture.

2. In a process for preparing a compound of the formula $$\begin{array}{c} CH_2\!-\!-\!CH\!-\!-\!-\!CH_2 \\ |\quad\quad|\quad\quad\quad\; | \\ CH_2\!-\!-\!N\!-\!R_2\;\;CH\!-\!OOC\!-\!CH\!-\!C_6H_5 \\ |\quad\quad|\quad\quad\quad\;\; | \\ CH_2\!-\!-\!CH\!-\!-\!-\!CH_2\quad\quad CHO \end{array}$$

wherein $R_2$ is straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl, which consists of subjecting an alcohol of the formula $$\begin{array}{c} CH_2\!-\!-\!CH\!-\!-\!-\!CH_2 \\ |\quad\quad|\quad\quad\quad\; | \\ CH_2\!-\!-\!N\!-\!R_2\;\;CHOH \\ |\quad\quad|\quad\quad\quad\;\; | \\ CH_2\!-\!-\!CH\!-\!-\!-\!CH_2 \end{array}$$

wherein $R_2$ has the meanings previously defined, to an ester interchange reaction with an α-formyl-phenylacetic acid lower alkyl ester in the presence of an inert organic solvent, the improvement which consists of heating said solvent to the boiling point, simultaneously adding to said boiling solvent a solution of said α-formyl-phenylacetic acid lower alkyl ester in said solvent and a solution of said alcohol in said solvent while continuously distilling off a vapor mixture consisting of said solvent and a lower alkanol at substantially the same volumetric rate as said solutions are being added, and recovering the reaction product from the reaction mixture.

3. In a process for preparing a compound of the formula $$\begin{array}{c} R\!-\!CH\!-\!CH\!-\!-\!CH_2 \\ |\quad\quad\;|\quad\quad\;\; | \\ \phantom{R-CH}\;N\!-\!R_2\;\;CH\!-\!OOC\!-\!CH\!-\!C_6H_5 \\ |\quad\quad\;|\quad\quad\;\;\; | \\ R'\!-\!CH\!-\!CH\!-\!-\!CH_2\quad\quad CHO \end{array}$$

wherein

R and R' are each hydrogen or, together with each other, oxygen, and $R_2$ is straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl, which consists of subjecting an alcohol of the formula $$\begin{array}{c} R\!-\!CH\!-\!CH\!-\!-\!CH_2 \\ |\quad\quad\;|\quad\quad\;\; | \\ \phantom{R-CH}\;N\!-\!R_2\;\;CHOH \\ |\quad\quad\;|\quad\quad\;\;\; | \\ R^1\!-\!CH\!-\!CH\!-\!-\!CH_2 \end{array}$$

wherein R, R' and $R_2$ have the meanings previously defined, to an ester interchange reaction with an α-formyl-phenyl-acetic acid lower alkyl ester in the presence of an inert organic solvent, the improvement which consists of heating said solvent to the boiling point, simultaneously adding to said boiling solvent a solution of said α-formyl-phenylacetic acid lower alkyl ester in said solvent and a solution of said alcohol in said solvent while continuously distilling off a vapor mixture consisting of said solvent and a lower alkanol at substantially the same volumetric rate as said solutions are being added, and recovering the reaction product from the reaction mixture.

4. In a process for preparing a compound of the formula $$\begin{array}{c} CH-CH---CH \\ \| \ \ \ | \ \ \ \ \ \ \ \ | \\ \ \ \ \ N-R_2 \ \ CH-OOC-CH-C_6H_5 \\ | \ \ \ \ \ | \ \ \ \ \ \ \ \ \ \ \ \ \ \ \ \| \\ CH-CH---CH_2 \ \ \ \ \ \ \ \ \ \ CHO \end{array}$$

wherein $R_2$ is a straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl, which consists of subjecting an alcohol of the formula $$\begin{array}{c} CH-CH---CH_2 \\ \| \ \ \ | \ \ \ \ \ \ \ \ | \\ \ \ \ \ N-R_2 \ \ CHOH \\ | \ \ \ \ \ | \ \ \ \ \ \ \ \ | \\ CH-CH---CH_2 \end{array}$$

wherein $R_2$ has the meanings defined above, to an ester interchange reaction with an α-formyl-phenylacetic acid lower alkyl ester in the presence of an inert organic solvent, the improvement which consists of heating said solvent to the boiling point, simultaneously adding to said boiling solvent a solution of said α-formyl-phenylacetic-acid lower alkyl ester is in said solvent and a solution of said alcohol in said solvent while continuously distilling off a vapor mixture consisting of said solvent and a lower alkanol at substantially the same volumetric rate as said solutions are being added, and recovering the reaction product from the reaction mixture.

5. In a process for the preparation of a compound of the formula $$\begin{array}{c} \ \ \ \ \ \ \ \ CH---CH_2 \\ \ \ \ \ \ / \ | \ \ \ \ \ \ \ \ \ | \\ R_1 \ \ N-R_2 \ \ R_3 \\ \ \ \ \ \ \backslash \ | \ \ \ \ \ \ \ \ \ | \\ \ \ \ \ \ \ \ \ CH---CH_2 \end{array}$$

wherein $R_1$ is $-(CH_2)_2-$, $-(CH_2)_3-$, $-CH=CH-$, $$-CH \ \ \ \ CH- \\ \ \ \ \ \backslash O /$$

$-CHOH-CH_2-$, $-CHOCH_3-CH_2-$ or $-CHOH-CHOH-$ and
$R_2$ is straight-chain alkyl of 1 to 16 carbon atoms, branched-chain alkyl of 3 to 5 carbon atoms, allyl, cycloalkyyl of 3 to 8 carbon atoms, benzyl, chlorobenzyl or phenyl-benzyl,
$R_3$ is $$\begin{array}{c} \ \ \ \ \ \ \ \ \ \ \ H \\ \ \ \ \ \ \ \ \ | \ / \\ \ \ \ \ \ \ \ \ C \\ \ \ \ \ \ | \ \cdot \cdot \\ \ \ \ \ \ \ \ \ \ \ O-CO-CH-C_6H_5 \\ \ \ \ \ \ \ \ \ \ \ \ \ \ \ \ \ \ \ \ \ | \\ \ \ \ \ \ \ \ \ \ \ \ \ \ \ \ \ \ \ \ \ CH_2OH \end{array}$$

or $$\begin{array}{c} \ \ \ \ \ \ \ \ \ \ \ \ \ \ \ \ \ CH_2OH \\ \ \ \ \ \ \ \ \ \ \ \ \ \ \ \ \ \ | \\ \ \ \ \ \ \ \ \ \ \ O-CO-CH-C_6H_5 \\ \ \ \ \ \ | \ / \\ \ \ \ \ \ \ \ \ C \\ \ \ \ \ \ | \ \cdot \cdot \\ \ \ \ \ \ \ \ \ \ \ \ H \end{array}$$

and
$R_1$ and $R_3$, together with each other, are $$\begin{array}{c} C_6H_5-CH-CO-O-CH- \\ \ \ \ \ \ \ \ | \ \ \ \ \ \ \ \ \ \ \ \ \ \ \ \ \ | \\ \ \ \ \ \ \ \ CH_2OH \ \ \ \ \ \ CH- \ \ -CH \\ \ \ \ \ \ \ \ \ \ \ \ \ \ \ \ \ \ \ \ \ \ \ \ \ \ \ \ \ \backslash \ \ \ / \\ \ \ \ \ \ \ \ \ \ \ \ \ \ \ \ \ \ \ \ \ \ \ \ \ \ \ \ \ \ \ O \end{array}$$

which consists of the steps of subjecting an alkaloid alcohol of the formula $R_5OH$ $$\begin{array}{c} \ \ \ \ \ \ \ \ \ \ \ H \\ \ \ \ \ \ \ \ \ | \ / \\ \ \ \ \ \ \ \ \ C \\ \ \ \ \ \ | \ \cdot \cdot \\ \ \ \ \ \ \ \ \ \ \ O-CO-CH-C_6H_5 \\ \ \ \ \ \ \ \ \ \ \ \ \ \ \ \ \ \ \ \ \ | \\ \ \ \ \ \ \ \ \ \ \ \ \ \ \ \ \ \ \ \ \ CH_2OH \end{array}$$

or $$\begin{array}{c} \ \ \ \ \ \ \ \ \ \ \ \ \ \ \ \ \ CH_2OH \\ \ \ \ \ \ \ \ \ \ \ \ \ \ \ \ \ \ | \\ \ \ \ \ \ \ \ \ \ \ O-CO-CH-C_6H_5 \\ \ \ \ \ \ | \ / \\ \ \ \ \ \ \ \ \ C \\ \ \ \ \ \ | \ \cdot \cdot \\ \ \ \ \ \ \ \ \ \ \ \ H \end{array}$$

wherein $R_5$ is $$\begin{array}{c} \ \ \ \ \ \ \ \ CH---CH_2 \\ \ \ \ \ \ / \ | \ \ \ \ \ \ \ \ \ | \\ R_1 \ \ N-R_2 \ \ CH- \\ \ \ \ \ \ \backslash \ | \ \ \ \ \ \ \ \ \ | \\ \ \ \ \ \ \ \ \ CH---CH_2 \end{array}$$

or $$\begin{array}{c} -CH-CH---CH_2 \\ \ \ \ \ | \ \ \ \ \ \ \ \ | \\ \ \ \ \ \ \ N-R_2 \ \ CH- \\ \ \ \ \ | \ \ \ \ \ \ \ \ | \\ \ \ \ \ CH-CH---CH_2 \ \ \ | \\ \ \ \ \ \ \ \ \ \ \ \ \ \ \ \ \ \ \ \ \ \ \ \ \ O \end{array}$$

where $R_1$ and $R_2$ have the meanings previously defined, to an ester interchange reaction with an α-formyl-phenylacetic acid lower alkyl ester in the presence of an inert organic solvent and reducing the α-formyl-phenylacetic acid alkaloid alcohol ester formed thereby, the improvements which consist of heating said solvent to the boiling point, simultaneously adding to said boiling solvent a solution of said α-formyl-phenylacetic acid lower alkyl ester in said solvent and a solution of said alkaloid alcohol in said solvent while continuously distilling off a vapor mixture consisting of said solvent and a lower alkanol at substantially the same volumetric rate as said solutions are being added, reducing the α-formyl-phenylacetic acid alkaloid alcohol ester formed thereby with an alkali metal borohydride in the presence of a solvent, and recovering the reaction product from the reaction mixture.

6. In a process for preparing a compound of the formula $$\begin{array}{c} CH_2-CH---CH_2 \\ | \ \ \ \ \ | \ \ \ \ \ \ \ \ \ | \\ CH_2 \ \ N-R_2 \ \ R_3 \\ | \ \ \ \ \ | \ \ \ \ \ \ \ \ \ | \\ CH_2-CH---CH_2 \end{array}$$

wherein
$R_2$ is straight-chain alkyl of 1 to 16 carbon atoms, branched-chain alkyl of 3 to 5 carbon atoms, allyl, cycoalkyl of 3 to 8 carbon atoms, benzyl, chlorobenzyl or phenyl-benzyl, and
$R_3$ is $$\begin{array}{c} \ \ \ \ \ \ \ \ \ \ \ H \\ \ \ \ \ \ \ \ \ | \ / \\ \ \ \ \ \ \ \ \ C \\ \ \ \ \ \ | \ \cdot \cdot \\ \ \ \ \ \ \ \ \ \ \ O-CO-CH-C_6H_5 \\ \ \ \ \ \ \ \ \ \ \ \ \ \ \ \ \ \ \ \ \ | \\ \ \ \ \ \ \ \ \ \ \ \ \ \ \ \ \ \ \ \ \ CH_2OH \end{array}$$

or $$\begin{array}{c} \ \ \ \ \ \ \ \ \ \ \ \ \ \ \ \ \ CH_2OH \\ \ \ \ \ \ \ \ \ \ \ \ \ \ \ \ \ \ | \\ \ \ \ \ \ \ \ \ \ \ O-CO-CH-C_6H_5 \\ \ \ \ \ \ | \ / \\ \ \ \ \ \ \ \ \ C \\ \ \ \ \ \ | \ \cdot \cdot \\ \ \ \ \ \ \ \ \ \ \ \ H \end{array}$$

which consists of the steps of subjecting an alkaloid alcohol of the formula $$\begin{array}{c} CH_2-CH---CH_2 \\ | \ \ \ \ \ | \ \ \ \ \ \ \ \ \ | \\ CH_2 \ \ N-R_2 \ \ CHOH \\ | \ \ \ \ \ | \ \ \ \ \ \ \ \ \ | \\ CH_2-CH---CH_2 \end{array}$$

wherein $R_2$ has the meanings previously defined, to an ester interchange reaction with an α-formyl-phenylacetic acid lower alkyl ester in the presence of an inert organic solvent and reducing the α-formyl-phenylacetic acid alkaloid alcohol ester formed thereby, the improvements which consist of heating said solvent to the boiling point, simultaneously adding to said boiling solvent a solution of said α-formyl-phenylacetic acid lower alkyl ester in said solvent and a solution of said alkaloid alcohol in said solvent while continuouly distilling off a vapor mixture consisting of said solvent and a lower alkanol at substantially the same volumetric rate as said solutions are being added, reducing the α-formyl-phenylacetic acid alkaloid alcohol ester formed thereby with an alkali metal borohydride in the presence of a solvent, and recovering the reaction product from the reaction mixture.

7. In a process for preparing a compound of the formula

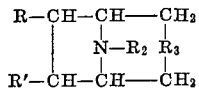

wherein
R and R' are each hydrogen or, together with each other, oxygen,
$R_2$ is straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl, and
$R_3$ is

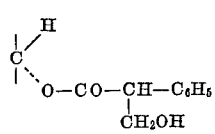

or

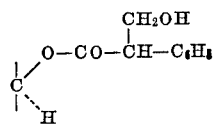

which consists of the steps of subjecting an alkaloid alcohol of the formula

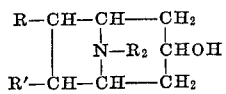

wherein R R' and $R_2$ have the meanings previously defined, to an ester interchange reaction with an α-formyl-phenyl- acetic acid lower alkyl ester in the presence of an inert organic solvent and reducing the α-formyl-phenylacetic acid alkaloid alcohol formed thereby, the improvements which consist of heating said solvent to the boiling point, simultaneously adding to said boiling solvent a solution of said α-formyl-phenylacetic acid lower alkyl ester in said solvent and a solution of said alcohol in said solvent while continuously distilling off a vapor mixture consisting of said solvent and a lower alkanol at substantially the same volumetric rate as said solutions are being added, reducing the α-formyl-phenylacetic acid alkaloid alcohol ester formed thereby with an alkali metal borohydride in the presence of a solvent, and recovering the reaction product from the reaction mixture.

8. In a process for preparing a compound of the formula

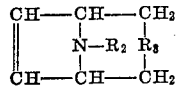

wherein
$R_2$ is straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl, and
$R_3$ is

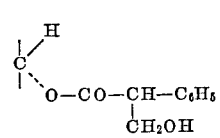

or

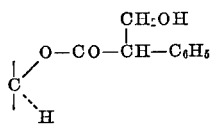

which consists of subjecting an alkaloid alcohol of the formula

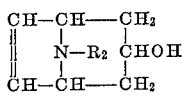

wherein $R_2$ has the meanings defined above, to an ester interchange reaction with an α-formyl-phenylacetic acid lower alkyl ester in the presence of an inert organic solvent and reducing the α-formyl-phenylacetic acid alkaloid alcohol ester formed thereby, the improvements which consist of heating said solvent to the boiling point, simultaneously adding to said boiling solvent a solution of said α-formyl-phenylacetic acid lower alkyl ester in said solvent and a solution of said alkaloid alcohol in said solvent while continuously distilling off a vapor mixture consisting of said solvent and a lower alkanol at substantially the same volumetric rate as said solutions are being added, reducing the α-formyl-phenylacetic acid alkaloid alcohol ester formed thereby with an alkali metal borohydride in the presence of a solvent, and recovering the reaction product from the reaction mixture.

9. In a process for preparing a compound of the formula

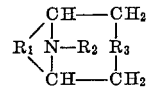

wherein
$R_1$ is —(CH$_2$)$_2$—, —(CH$_2$)$_3$—, —CH=CH—,

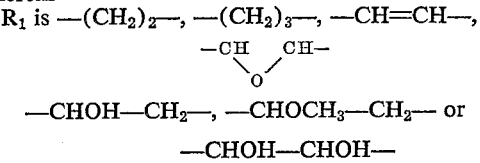

—CHOH—CH$_2$—, —CHOCH$_3$—CH$_2$— or

—CHOH—CHOH— and
$R_2$ is straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl,
$R_3$ is

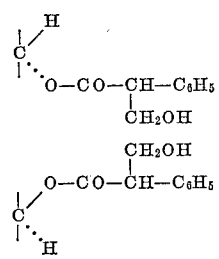

and
$R_1$ and $R_3$, together with each other, are

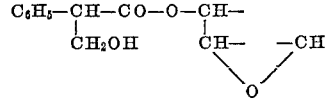

which consists of reducing an α-formyl-phenylacetic acid alkaloid alcohol ester of the formula

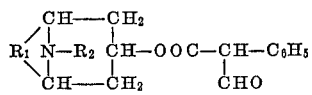

wherein $R_1$ and $R_2$ have the meanings previously defined, the improvement which consists of effecting the reduction with an alkali metal borohydride in the presence of a solvent.

10. In a process for preparing a compound of the formula

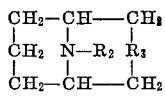

wherein

R₂ is straight-chain alkyl of 1 to 16 carbon atoms, branched-chain alkyl of 3 to 5 carbon atoms, allyl, cycloalkyl of 3 to 8 carbon atoms, benzyl, chlorobenzyl, and R₃ is

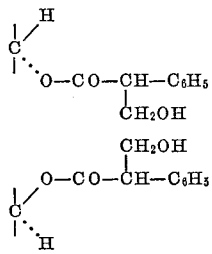

or which consists of reducing an α-formyl-phenyl-acetic acid alkaloid alcohol ester of the formula

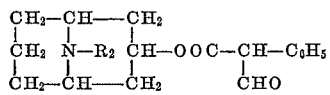

wherein

R₂ is straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl, wherein R₁ and R₂ have the meanings previously defined, the improvement which consists of effecting the reduction with an alkali metal borohydride in the presence of a solvent.

11. In a process for preparing a compound of the formula

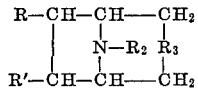

wherein

R and R' are each hydrogen or, together with each other, oxygen,

R₂ is straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl, and R₃ is

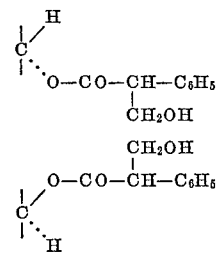

or which consists of reducing an α-formyl-phenyl-acetic acid alkaloid alcohol ester of the formula

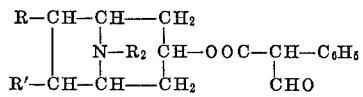

wherein R, R' and R₂ have the meanings previously defined, the improvement which consists of effecting the reduction with an alkali metal borohydride in the presence of a solvent.

12. In a process for preparing a compound of the formula

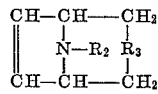

wherein

R₂ is straight-chain alkyl of 1 to 16 carbon atoms, branched-chain alkyl of 3 to 5 carbon atoms, allyl, cycloalkyl of 3 to 8 carbon atoms, benzyl, chlorobenzyl or phenyl-benzyl, and R₃ is

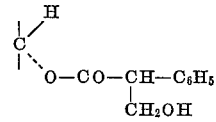

or

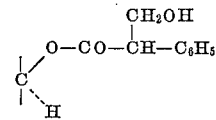

which consists of reducing an α-formyl-phenyl-acetic acid alkaloid alcohol ester of the formula

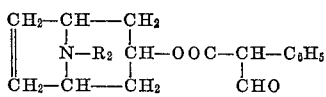

wherein R₂ has the meaning previously defined, the improvement which consists of effecting the reduction with an alkali metal borohydride in the presence of a solvent.

References Cited

Gaylord, Reduction With Complex Metal Hydrides, Interscience, pp. 491–7, (1956).

Migrdichian, Organic Synthesis, vol. 1, Reinhold, pp. 328–9, (1957).

Roberts et al., Basic Principles In Organic Chemistry, Benjamin, pp. 531–3, (1965).

ALAN L. ROTMAN, Primary Examiner

U.S. Cl. X.R.

260—294.3, 999

PO-1050
(5/69)

UNITED STATES PATENT OFFICE
CERTIFICATE OF CORRECTION

Patent No. 3,583,996          Dated June 8, 1971

Inventor(s) Rolf Banholzer, Alex Heusner, Otto Korndörfer, Werner Schulz, Gerhard Walther, and Karl Zeile It is certified that error appears in the above-identified patent and that said Letters Patent are hereby corrected as shown below:

Col. 3, line 39, change Formula VII to read $$R_5O - CO - \underset{|}{CH} - C_6H_5$$
$$CHO$$

Col. 7, lines 24-25, delete "The aqueous mixture was then of water was added."

Col. 8, line 52, correct "nor-tropic" to read --nortropine--.

Col. 9, line 63, correct "nortropine" to read --noratropine--.

Col. 18, delete lines 4 through 14.

Col. 22, lines 45-50, correct the formula to read

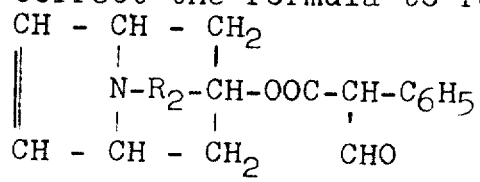

Signed and sealed this 2nd day of November 1971.

(SEAL)
Attest:

EDWARD M. FLETCHER, JR.          ROBERT GOTTSCHALK
Attesting Officer                Acting Commissioner of Patents